(12) United States Patent
Kothe et al.

(10) Patent No.: US 11,027,646 B2
(45) Date of Patent: Jun. 8, 2021

(54) MOTOR VEHICLE LOCK ARRANGEMENT

(71) Applicant: Brose Fahrzeugteile GmbH & Co. Kommanditgesellschaft, Bamberg, Bamberg (DE)

(72) Inventors: Markus Kothe, Velbert (DE); Fatih Erarslan, Schwelm (DE)

(73) Assignee: Brose Fahrzeugteile GmbH SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 16/676,856

(22) Filed: Nov. 7, 2019

(65) Prior Publication Data

US 2020/0172002 A1 Jun. 4, 2020

(30) Foreign Application Priority Data

Nov. 7, 2018 (DE) ................... 10 2018 127 790.3

(51) Int. Cl.
*H05B 47/105* (2020.01)
*H05B 45/10* (2020.01)
(Continued)

(52) U.S. Cl.
CPC .............. *B60Q 1/323* (2013.01); *E05B 17/10* (2013.01); *E05B 63/22* (2013.01); *H05B 45/10* (2020.01);
(Continued)

(58) Field of Classification Search
CPC .......... E05B 81/20; E05B 81/04; E05B 81/14; E05B 81/22; E05B 81/70; E05B 81/56; E05B 85/107; E05B 83/16; E05B 83/36; E05B 83/40; B60R 25/24; B60J 5/08; B60J 5/047; E05F 15/616; E05Y 2201/22; E05Y 2201/434; E05Y 2201/622; E05Y 2400/40;
(Continued)

(56) References Cited

U.S. PATENT DOCUMENTS 9,322,206 B2 * 4/2016 Fukui .................. B60R 25/2045
10,480,221 B2 11/2019 Cumbo
(Continued)

FOREIGN PATENT DOCUMENTS

DE 102012107800 2/2014
DE 102014205371 9/2015
EP 2670932 7/2014

*Primary Examiner* — Henry Luong
(74) *Attorney, Agent, or Firm* — Pauly, DeVries Smith & Deffner LLC

(57) ABSTRACT

A motor vehicle lock arrangement for a motor vehicle door which is adjustably coupled to a motor vehicle body work, wherein the motor vehicle lock arrangement has a motor vehicle lock wherein the motor vehicle lock arrangement has a push-open arrangement for applying a drive force to the motor vehicle door in its opening direction, so that the motor vehicle door can be adjusted, in a motor-operated push-open process, from a closed door position into a push-open door position which is located further in the opening direction of said motor vehicle door, and as a result an engagement gap can be produced between the motor vehicle door and the motor vehicle body work. It is proposed that the motor vehicle lock arrangement has a light arrangement and a light controller for actuating the light arrangement.

18 Claims, 2 Drawing Sheets

(51) Int. Cl.
*B60Q 1/32* (2006.01)
*E05B 17/10* (2006.01)
*E05B 63/22* (2006.01)
*B60J 5/04* (2006.01)

(52) U.S. Cl.
CPC ............... *H05B 47/105* (2020.01); *B60J 5/04* (2013.01); *E05Y 2900/531* (2013.01)

(58) Field of Classification Search
CPC ............. E05Y 2400/31; E05Y 2800/12; E05Y 2800/422; E05Y 2900/55; E05Y 2900/546; E05Y 2900/531; Y10T 292/0914
See application file for complete search history.

(56) References Cited

U.S. PATENT DOCUMENTS

| | | | |
|---|---|---|---|
| 2013/0091770 A1* | 4/2013 | Chen ....................... | E05F 15/43 49/28 |
| 2019/0024421 A1* | 1/2019 | Cumbo ................ | E05F 15/611 |

\* cited by examiner

MOTOR VEHICLE LOCK ARRANGEMENT

CLAIM OF PRIORITY

This application claims the benefit of German Patent application No. DE 10 2018 127 790.3 filed on Nov. 7, 2018, the disclosure of which is incorporated herein by reference.

FIELD OF THE TECHNOLOGY

The disclosure relates to a motor vehicle lock arrangement, to a motor vehicle door having such a motor vehicle lock arrangement and to a method for operating such a motor vehicle lock arrangement.

BACKGROUND

The motor vehicle lock arrangement in question is assigned to a motor vehicle door which can be any type of lock element of a motor vehicle. This includes, in particular, side doors, rear doors, tailgates, boot lids, front bonnets, engine bonnets or the like. These closure elements can basically also be configured in the manner of sliding doors.

The known motor vehicle lock arrangement (DE 10 2014 205 371 A1), according to which the disclosure is based, is equipped with a motor vehicle lock which interacts in a customary fashion with a lock element which is configured, for example, as a locking bar. The motor vehicle lock has a push-open arrangement for applying a drive force to the motor vehicle door in its opening direction. It is therefore possible to generate a motor-driven push-open process, by means of which it is possible to generate an engagement gap between the motor vehicle door and the motor vehicle body work. By generating such an engagement gap it is possible for the user to engage behind the motor vehicle door and pivot open the motor vehicle door manually. The implementation of such a motor-operated push-open process is significant in particular in the case of doors without handles.

While the motor vehicle doors above which are without handles permit a particularly large degree of freedom in respect of the shaping of the outer skin of the door, it remains a challenge to ensure a high level of user comfort. A reason for this is that the correct, in particular safe, time for the user to engage behind the motor vehicle door is not always clear.

Known visual warning systems DE 10 2012 107 800 A1, EP 2 670 932 B1 do not help further in regards to the above challenge. Such warning systems are primarily directed at warning the user against motor-driven adjustment movements of the motor vehicle door relevant to trapping.

SUMMARY

The disclosure is based on the problem of configuring and developing the known motor vehicle lock arrangement in such a way that the comfort of use is increased in particular when opening the motor vehicle door.

The basic idea that not only the location of the engagement gap but also the correct time to engage behind the motor vehicle door can be displayed visually in a particularly simple way by means of the light arrangement is essential.

In particular it is proposed that the motor vehicle lock arrangement has a light arrangement and a light controller for actuating the light arrangement, wherein the light controller actuates the light arrangement into the illuminating state, in the region of at least part of the engagement gap, during the push-open process and/or in response to the conclusion of the push-open process.

According to the proposal, the light arrangement is therefore assigned an indicator function which is directed at the possibility of the manual pivoting open of the motor vehicle door. Such a light arrangement can be implemented, in particular, using modern LED technology in a cost-effective way and virtually invisibly in respect of its installation.

Various embodiments relate to the illumination of the light arrangement outwards from the engagement gap. It can be the case here that in the mounted state the light arrangement is arranged between the motor vehicle door and the motor vehicle body work, with the result that the light arrangement is invisible to the user in the non-illuminating state.

In some embodiments, the light controller is accommodated in the motor vehicle lock, which corresponds to a particularly compact design. At this point it will be quite generally pointed out that the light controller is any technical control means which can bring about actuation of the light arrangement. Correspondingly, the light controller can comprise an electronic control unit. In the simplest case, however, the light controller is composed of a simple microswitch which interacts, for example, with a locking element of the motor vehicle lock.

The light arrangement can be operated with different light configurations by the light controller in accordance with various embodiments. This means that depending on the lighting configuration the light arrangement illuminates in a different color and/or illuminates in a pulsed fashion. The different lighting configurations, which can be set by means of the light controller, provide the possibility of the visual communication of quite different information to the user.

In particular, the lighting configuration of the light arrangement can be set differently in accordance with the operating state of the motor vehicle lock arrangement. This makes it possible to use simple means to communicate a comparatively large amount of information to the user.

Various embodiments relate to variants for the actuation, in particular the lighting configuration, of the light arrangement in accordance with the state of the motor vehicle lock arrangement. While some embodiments relate to the increasing of the comfort of use during the push-open process, some embodiments can be directed to the visual indication of an instance of trapping by means of the light arrangement.

Such an instance of trapping can occur, for example, during a closing process according to some embodiments. It becomes apparent here that the proposed solution can serve not only to increase the comfort of use but also to increase user safety.

Various embodiments relate to structural variants for the configuration of the light arrangement. The furnishing of light arrangement with an LED strip according to some embodiments permits installation of the light arrangement in a way which is invisible in the above sense.

With some embodiments it is made clear that the optical indication signals of the light arrangement can be advantageously combined with the acoustic indication signals of an acoustic arrangement. Predetermined synchronisation between the acoustic arrangement and the light arrangement is provided for this. The user's attention can therefore be attracted in a particularly effective way.

According to various embodiments, a motor vehicle door is disclosed with a proposed motor vehicle arrangement as such. Reference can be made to all these statements relating to the first-mentioned teaching.

In various embodiments, the motor vehicle door is equipped with an engagement region behind which a user's hand cannot engage until the engagement gap is generated. In some embodiments, the light arrangement illuminates in the region of the engagement region so that this engagement region can be readily found by the user.

According to various embodiments, a method is disclosed for operating a proposed motor vehicle lock arrangement as such. In this respect it is also possible to refer to all the statements relating to the first-mentioned teaching.

Various embodiments provide a motor vehicle lock arrangement for a motor vehicle door which is adjustably coupled to a motor vehicle body work, wherein the motor vehicle lock arrangement has a motor vehicle lock which in the mounted state is arranged on the motor vehicle door or on the motor vehicle body work, wherein the motor vehicle lock arrangement, in particular the motor vehicle lock has a push-open arrangement for applying a drive force to the motor vehicle door in its opening direction, so that the motor vehicle door can be adjusted, in a motor-operated push-open process, from a closed door position, in particular a main closed door position or a pre-closed door position, into a push-open door position which is located further in the opening direction of said motor vehicle door, and as a result an engagement gap can be produced between the motor vehicle door and the motor vehicle body work, wherein the motor vehicle lock arrangement has a light arrangement and a light controller for actuating the light arrangement, and in that the light controller actuates the light arrangement into the illuminating state during the push-open open process and/or in response to the conclusion of the push-open process in the region of at least part of the engagement gap.

In some embodiments, the light arrangement illuminates at least part of the engagement gap during the push-open process and/or in response to the conclusion of the push-open process, and/or in that the light arrangement illuminates outwards from the engagement gap during the push-open process and/or in response to the conclusion of the push-open process.

In some embodiments, the light controller is arranged in the motor vehicle lock and/or in the motor vehicle door.

In some embodiments, the light arrangement can be operated with different lighting configurations by means of the light controller, such as the light arrangement illuminates in different colors depending on the lighting configuration, and/or in that depending on the lighting configuration the light arrangement illuminates continuously or in a pulsed fashion, or in particular with a different pulse frequency, and/or depending on the lighting configuration the light arrangement illuminates with different brightness.

In some embodiments, the light arrangement illuminates with a different lighting configuration in accordance with the operating state of the motor vehicle lock arrangement.

In some embodiments, after the conclusion of the push-open process, the motor vehicle door can be pivoted open manually, and in that, in response to the pivoting open of the motor vehicle door, the light arrangement does not illuminate or illuminates with a different lighting configuration, in particular with a different color, such as in that in the mounted state the light arrangement illuminates in the rearward direction of the motor vehicle in response to the pivoting open of the motor vehicle door.

In some embodiments, the light arrangement illuminates with a different lighting configuration, such as with a different color and/or with a different pulse frequency, during the push-open process and in response to the conclusion of the push-open process.

In some embodiments, the motor vehicle lock arrangement has a closing arrangement for closing the motor vehicle door into a closing door position, in particular from a pre-closing door position into a main closing door position, within the scope of a closing process, and in that during the closing process the light arrangement illuminates with a lighting configuration which is assigned to the closing process.

In some embodiments, the motor vehicle lock arrangement has an anti-trap device for, in particular, sensor-based, sensing an instance of trapping, and in that in response to the sensing of an instance of trapping the light arrangement illuminates with a lighting configuration which is assigned to the instance of trapping.

In some embodiments, the light arrangement has an elongate light region which extends along part of the longitudinal extent of the engagement gap.

In some embodiments, the light region of the light arrangement is configured as an illuminant strip with a number of illuminants, in particular as LED strips with a number of LEDs, or in that the light area of the light arrangement is configured as a lightguide.

In some embodiments, the motor vehicle lock has an electric connection or an optical connection for actuating the light arrangement, and in that the light arrangement is connected electrically or optically to the connection.

In some embodiments, an acoustic arrangement is provided for generating acoustic indication signals for the user, and that the acoustic arrangement generates acoustic signals with predetermined synchronization with the light arrangement.

Various embodiments provide a motor vehicle door having a motor vehicle lock arrangement according to the description, wherein the motor vehicle door has an engagement region, behind which a user's hand can engage when the engagement gap is produced, and otherwise said engagement area is inaccessible to the user's hand, such as in that the motor vehicle door has a door outer skin which is configured without a handle.

Various embodiments provide a method for operating a motor vehicle lock arrangement, such as described herein, for a motor vehicle door which is adjustably coupled to a motor vehicle body work, wherein the motor vehicle lock arrangement has a motor vehicle lock which in the mounted state is arranged on the motor vehicle door or on the motor vehicle body work, wherein the motor vehicle lock arrangement, in particular the motor vehicle lock, has a push-open arrangement for applying a drive force to the motor vehicle door in its opening direction, so that the motor vehicle door can be adjusted, in a motor-operated push-open process, from a closed door position, in particular a main locking door position or a pre-locking door position, into a push-open door position which is located further in the opening direction of said motor vehicle door and as a result an engagement gap can be produced between the motor vehicle door and the motor vehicle body work, wherein the motor vehicle lock arrangement has a light arrangement and a light controller for actuating the light arrangement and in that the light arrangement is actuated by the light controller into the illuminating state during the push-open process and/or in response to the conclusion of the push-open process in the region of at least part of the engagement gap.

BRIEF DESCRIPTION OF THE DRAWINGS

In the text which follows, the disclosure will be discussed in more detail with reference to a drawing which illustrates just one exemplary embodiment. In the drawing.

DETAILED DESCRIPTION

Figure 1:
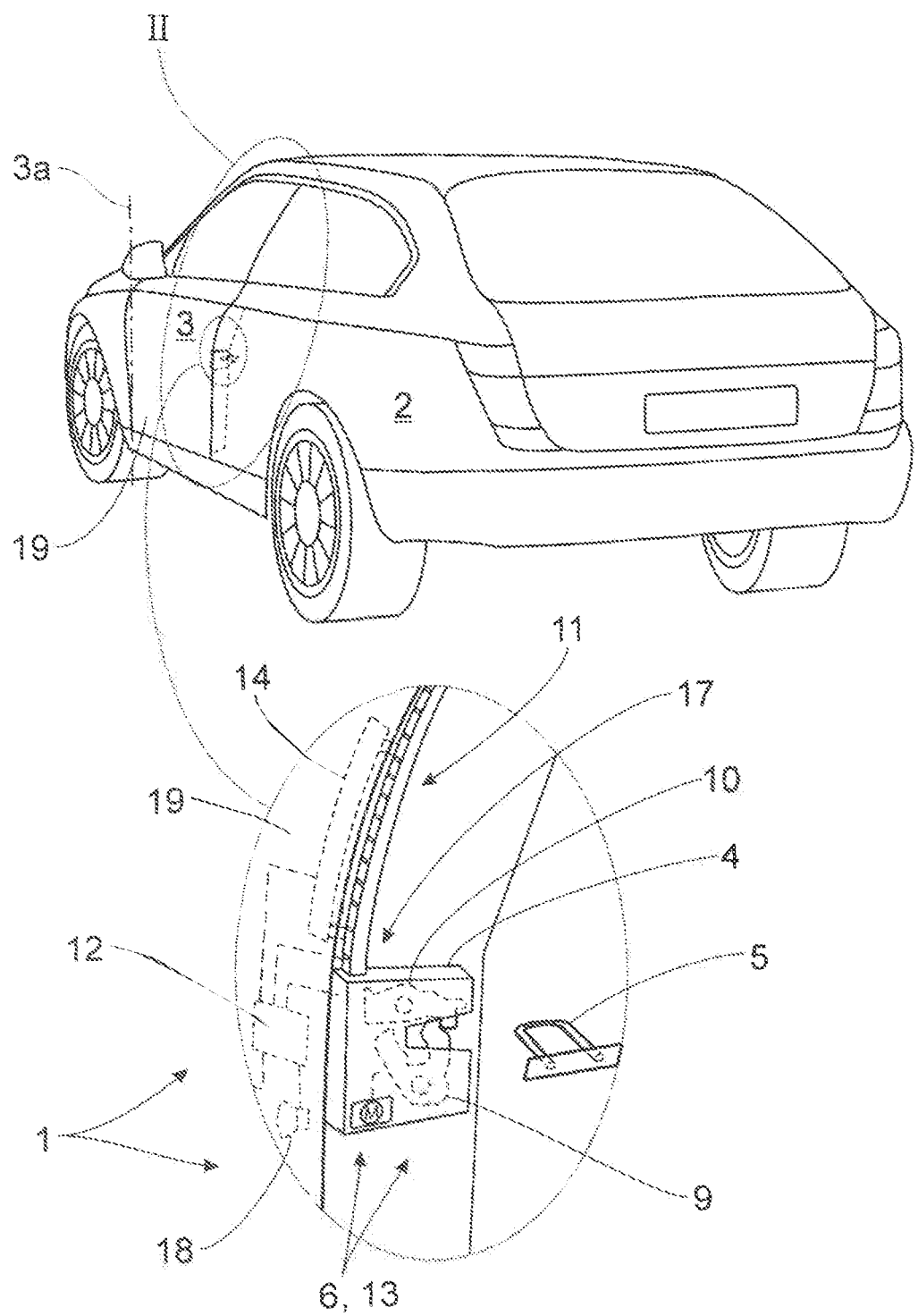
FIG. 1 shows the rear view of a motor vehicle with a proposed motor vehicle lock arrangement.

The proposed motor vehicle lock arrangement 1 is assigned to a motor vehicle door 3 which is adjustably coupled to a motor vehicle body work 2. The motor vehicle door 3 may be any closure element of a motor vehicle. For a broad understanding of the term "motor vehicle door", reference can be made to the introductory part of the description. The motor vehicle door 3 is here a side door which can be pivoted about a pivoting axis 3a which is oriented essentially perpendicularly.

The motor vehicle lock arrangement 1 has a motor vehicle lock 4 which, in the mounted state, can be arranged on the motor vehicle door 3. In order to secure the motor vehicle door 3 in its closed position, interaction of the motor vehicle lock 4 with a locking element 5 is provided, said element 5 being arranged here on the motor vehicle body work 2. The arrangement of the motor vehicle lock 4, on the one hand, and locking element 5, on the other, can basically also be provided in an inverted fashion.

The illustration according to FIG. 1 shows an illustration of a detail in which the motor vehicle body work 2 is not shown for sake of better clarity. In addition, the locking element 5 is illustrated there after having been moved out of engagement with the motor vehicle lock 4, in the manner of an exploded illustration, which improves the clarity further.

The locking element 5 can be a locking bar, a locking pin or the like. However, the embodiment of the locking element 5 plays only a subordinate role for the proposed solution.

The motor vehicle lock arrangement 1 has a push-open arrangement 6 for applying a drive force to the motor vehicle door 3 in its opening direction 7a, with the result that in a motor-driven push-open process the motor vehicle door 3 can be adjusted from a locking door position illustrated in FIG. 1 into a push-open door position which is located further in the direction of opening 7a of said door and is shown in FIG. 2a, as a result of which an engagement gap 8 can be generated between the motor vehicle door 3 and the motor vehicle body work 2. The gap width of the engagement gap 8 extends along the opening direction 7a of the motor vehicle door 3 owing to the possibility of pivoting the motor vehicle door 3.

The locking door position which forms the starting point for the push-open process is here the main locking door position, which position is the completely closed door position. It can basically also be provided that the locking door position which forms the starting point for the push-open process is the pre-locking door position which is positioned slightly after the main locking door position when viewed in the opening direction 7a of the motor vehicle door 3.

Basically, the push-on arrangement 6 can be embodied and arranged separately from the motor vehicle lock 4. In the case of the exemplary embodiment which is illustrated, it is the case that the push-on arrangement 6 is a component of the motor vehicle lock 4. The motor vehicle lock 4 has the customary locking elements of the lock latch 9 and detent pawl 10, wherein the lock latch 9 interacts with the locking element 5 mentioned above. On the one hand, when the motor vehicle door 3 is closed, the lock latch 9 is in holding engagement with the locking element 5. On the other hand, within the scope of the motor-driven push-open process the lock latch 9 acts on the locking element 5 in such a way that the motor vehicle door 3 is adjusted in its opening direction 7a into the push-open door position. With respect to some embodiments of the push-open arrangement 6, reference can be made to German Patent Application DE 10 2014 205 371 A1, which is by the applicant and whose content is in this respect made is a subject matter of the present application and incorporated in its entirety.

The engagement gap 8 clears here an engagement region 3b of the motor vehicle door 3, so that the user's hand H can engage behind the engagement gap 8 and bring about manual pivoting of the motor vehicle door 3 by means of an activation force on the engagement region 3b. For this the gap width of the engagement gap 8 can be larger than 18 mm and can be larger than 22 mm. In some embodiments, the gap width of the engagement gap 8 is between approximately 26 mm and approximately 31 mm. These values have proven advantageous in particular for the engagement behind the engagement gap 8 by a user's hand H.

The engagement gap 8 with the assigned engagement region 3b can be located in an upper region of the outer skin 19 of the motor vehicle door 3, as shown in FIG. 2a. Correspondingly, the light arrangement 11 is also located in the upper region of the outer skin 19 of the motor vehicle door 3.

As mentioned further above, in a first alternative the light arrangement 11 illuminates during the push-open process in order to indicate to the user that the push-open process is occurring. Alternatively or additionally, the light arrangement 11 illuminates in response to the conclusion of the push-open process. This means that when the push-open door position is reached the light arrangement 11 is actuated into the illuminating state. In the first-mentioned case, the light arrangement 11 can be transferred from the non-illuminating state into the illuminating state when the push-open process starts.

In various embodiments, the light arrangement 11 is embodied and arranged in such a way that the illumination of the light arrangement 11 corresponds to the illumination of at least part of the engagement gap 8. Alternatively or additionally there may be provision that the illumination of the light arrangement 11 coincides with an illumination outwards from the engagement gap 8. The light arrangement 11 is then therefore arranged precisely between the motor vehicle door 3 and the motor vehicle body work 2 insofar as the motor vehicle door 3 is located in the completely closed position shown in FIG. 1.

As has already been explained above, the light controller 12 can be of different complexity. The light controller 12 can be arranged in the motor vehicle lock 4 and/or the motor vehicle door 3, with the result that the connection of the light arrangement 11 is unproblematic. It is however also basically conceivable for the light controller 12 to be assigned to a central controller which is arranged at the body work end.

The light arrangement 11 can be operated with different light configurations by means of the light controller 12. This can mean that depending on the lighting configuration the light arrangement 11 illuminates in different colors. Alternatively or additionally there may be provision that depending on the lighting configuration the light arrangement 11 illuminates continuously, that is to say uninterruptedly or in a pulsed fashion, in particular with a different pulse frequency. The different lighting configuration can basically also relate to illumination with a different brightness.

Quite generally, there can be provision that the light arrangement 11 illuminates with a different lighting configuration in accordance with the operating state of the motor vehicle lock arrangement 1.

A particularly intuitive display of the operating state of the motor vehicle arrangement 1 is obtained, for example, by virtue of the fact that during the push-open process the light arrangement 11 illuminates in a first color, for example in a blue color, and in response to the conclusion of the push-open process illuminates with a second color, for example with a green color. With the first color the user is alerted to the fact that the push-open process is occurring, while the second color signals in a particularly intuitive way enabling of engagement behind the engagement gap 8 and of the pivoting open of the motor vehicle door 3.

For example there may be provision that after the conclusion of the push-open process, that is to say after the push-open door position has been reached, the motor vehicle door 3 can be swung open manually. It is then the case that in response to the pivoting open of the motor vehicle door 3 the light arrangement 11 does not illuminate or illuminates with a different lighting configuration, in particular in a different color. The illumination of the light arrangement 11 in response to the pivoting open of the motor vehicle door 3 can be used, for example, to signal the pivoting open of the motor vehicle door 3 to the road traffic behind. For this, the light arrangement 11 can be embodied and arranged in such a way that in the mounted state the light arrangement 11 illuminates in the rearward direction of the motor vehicle in response to the pivoting open of the motor vehicle door 3.

As mentioned above it may be advantageous that the light arrangement 11 illuminates with a different lighting configuration during the push-open process and in response to the conclusion of the push-open process. The above lighting configuration can relate to the illumination with a different color and/or with a different pulse frequency.

Depending on the functional equipment of the motor vehicle lock arrangement 1, the motor vehicle lock arrangement 1 can have a closing arrangement 13 for closing the motor vehicle door 3 in a closing direction 7b of the motor vehicle door 3 into a closing door position, here from the pre-locking door position into the main locking door position, within the scope of a closing process. The closing process can be found in the illustration according to FIG. 2b.

The light controller 12 actuates the light arrangement 11 in such a way that during the closing process the light arrangement 11 illuminates with a light configuration which is assigned to the closing process. The light arrangement 11 here illuminates in a red color during the closing process, in order to signal that an action which is relevant to trapping, specifically of the closing process, is occurring.

In various embodiments, the motor vehicle arrangement 1 has an anti-trapping device 14, for performing sensor-based sensing of an instance of trapping. The anti-trapping device is configured here with a capacitive proximity sensor 15 which extends essentially along the engagement gap 8. In response to the sensing of an instance of trapping, the light arrangement 11 then illuminates with a lighting configuration which is assigned to the instance of trapping. This is pulsating illumination with a red color here.

Figure 2:
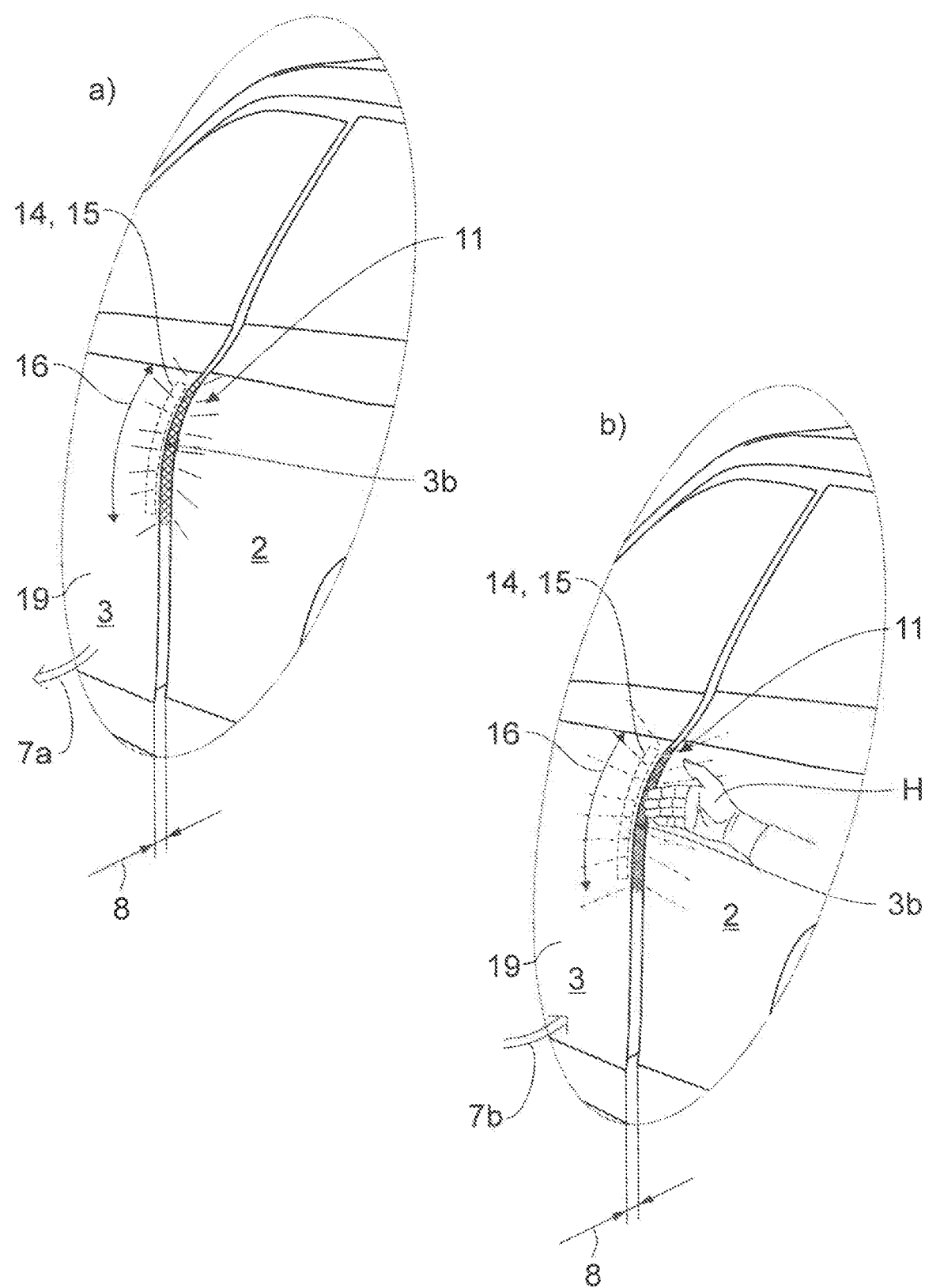
FIG. 2 shows the proposed motor vehicle lock arrangement according to FIG. 1 a) during the push-open process and b) during the closing process, in an instance of trapping.

The term "instance of trapping" is to be understood in a broad fashion here. It comprises not only the trapping of a body part of the user in the narrowest sense but also the approaching of a body part of the user to the engagement gap 8 in which a predetermined minimum distance is undershot. An instance of trapping in such a broad sense is shown in FIG. 2 within the scope of a closing process.

The illustration of the detail according to FIG. 1 shows that the light arrangement 11 has an elongate light region 16 which extends along part of the longitudinal extent of the engagement gap 8. The light region 16 is the region in which the light arrangement 11 visibly illuminates.

In various embodiments, the light region 16 of the light arrangement 11 is configured as an illuminant strip with a number of illuminants, in particular as LED strips with a number of LEDs. Alternatively, the light region 16 of the light arrangement 11, can, however, also be configured as a lightguide which is supplied by a light source.

Quite uniformly in the case of the illustrated exemplary embodiment, the motor vehicle lock 4 supplies the light arrangement 11 with electrical and/or optical energy. Alternatively, there can be provision that the motor vehicle lock 4 actuates the light arrangement 11. In the last-mentioned case, the light controller 12 is, as mentioned above, assigned to the motor vehicle lock 4.

In particular there can be provision that the motor vehicle lock 4 has an electrical connection 17 in that the light arrangement 11 is electrically connected to the connection 17. Alternatively, the connection 17 can also be an optical connection, so that the light arrangement 11 is optically connected to the connection 17. In both cases it is advantageous that the motor vehicle lock 4 is used quite generally to supply the light arrangement 11, which reduces the expenditure on mounting and cabling.

The proposed light arrangement 11 can basically be combined with other types of signal generators. Here it can be therefore the case that an acoustic arrangement 18 is provided which serves to produce acoustic indication signals for the user. The acoustic arrangement 18 generates acoustic signals with predetermined synchronization with the light arrangement 11. The predetermined synchronization can be provided in any form, for example there may be provision that the pulsating of the illumination of the light arrangement 11 is co-ordinated with a pulsating acoustic signal in such a way that an acoustic signal is generated whenever the light arrangement 11 lights up.

According to a further teaching which acquires independent significance, the motor vehicle door 3 is disclosed with a proposed motor vehicle lock arrangement 1 as such. In this respect, reference can be made to all the statements relating to the proposed motor vehicle lock arrangement 1.

In various embodiments, the motor vehicle door 3 has an engagement region 3b which has been mentioned further above and behind which when the engagement gap 8 is produced, a user's hand H can engage, and is otherwise inaccessible to the user's hand H. The engagement region 3b forms as it were an undercutting in the region of the engagement gap 8 behind which the user's hand H can engage.

The proposed solution can be applied particularly advantageously for a motor vehicle door 3 which has a door outer skin 19 without a door handle. This means that the door outer skin 19 does not have a handle part by means of which force can be applied by a user to pivot open the motor vehicle door 3. The engagement region 3b therefore replaces any type of door components. The door outer skin 19 can therefore be implemented with particularly high flexibility in terms of design.

The engagement region 3b is correspondingly configured specifically for engagement with the user's hand H. For example, the engagement region 3b can have a resilient, in particular rubber-like, support which ensures haptically pleasant engagement.

According to a further teaching, a method for operating a proposed motor vehicle arrangement 1 is disclosed.

It is essential according to the proposed method that the motor vehicle lock arrangement 1 has a light arrangement 11, as mentioned above, and a light controller 12, as mentioned above, for controlling the light arrangement 11, wherein the light arrangement 11 is actuated into the luminating state by means of the light controller 12 during the push-open process and/or in response to the conclusion of the push-open process in the region of at least part of the engagement gap 8. In this respect, reference can also be made to all statements relating to the operation of the proposed motor vehicle lock arrangement 1.

The invention claimed is:

1. A motor vehicle lock arrangement for a motor vehicle door which is adjustably coupled to a motor vehicle body work,
    wherein the motor vehicle lock arrangement has a motor vehicle lock which in a mounted state is arranged on the motor vehicle door or on the motor vehicle body work,
    wherein the motor vehicle lock arrangement, in particular the motor vehicle lock has a push-open arrangement for applying a drive force to the motor vehicle door in its opening direction, so that the motor vehicle door can be adjusted, in a motor-operated push-open process, from a closed door position, in particular a main closed door position or a pre-closed door position, into a push-open door position which is located further in the opening direction of said motor vehicle door, and as a result an engagement gap can be produced between the motor vehicle door and the motor vehicle body work,
    wherein the motor vehicle lock arrangement has a light arrangement and a light controller for actuating the light arrangement,
    wherein the light controller actuates the light arrangement into an illuminating state during the motor-operated push-open open process and/or in response to a conclusion of the motor-operated push-open process in a region within the engagement gap and the light arrangement is positioned between the motor vehicle door and motor vehicle body work,
    wherein the light controller is arranged in the motor vehicle lock,
    wherein the push-open arrangement is a component of the motor vehicle lock,
    wherein the motor vehicle lock has an electric connection or an optical connection for actuating the light arrangement, and
    wherein the light arrangement is connected electrically or optically to the electric connection.

2. The motor vehicle lock arrangement according to claim 1, wherein the light arrangement illuminates at least part of the engagement gap during the motor-operated push-open process and/or in response to the conclusion of the motor-operated push-open process, and/or wherein the light arrangement illuminates outwards from the engagement gap during the motor-operated push-open process and/or in response to the conclusion of the motor-operated push-open process.

3. The motor vehicle lock arrangement according to claim 1, wherein the light arrangement is configured to be operated with different lighting configurations by the light controller.

4. The motor vehicle lock arrangement according to claim 1, wherein the light arrangement illuminates with different lighting configurations in accordance with an operating state of the motor vehicle lock arrangement.

5. The motor vehicle lock arrangement according to claim 4, wherein, after the conclusion of the motor-operated push-open process, the motor vehicle door can be pivoted open manually, and wherein, in response to pivoting open the motor vehicle door, the light arrangement does not illuminate or illuminates with a different lighting configuration, in particular with a different color.

6. The motor vehicle lock arrangement according to claim 1, wherein the light arrangement illuminates with a different lighting configuration during the motor-operated push-open process and in response to the conclusion of the motor-operated push-open process.

7. The motor vehicle lock arrangement according to claim 1, wherein the motor vehicle lock arrangement has a closing arrangement for closing the motor vehicle door into a closing door position, in particular from the pre-closing door position into the main closing door position, within the scope of a closing process, and wherein during the closing process the light arrangement illuminates with a lighting configuration which is assigned to the closing process.

8. The motor vehicle lock arrangement according to claim 1, wherein the motor vehicle lock arrangement has an anti-trap device for, in particular, sensor-based, sensing an instance of trapping, and wherein in response to sensing of an instance of trapping,. the light arrangement illuminates with a lighting configuration which is assigned to the instance of trapping.

9. The motor vehicle lock arrangement according to claim 1, wherein the light arrangement has an elongate light region which extends along part of a longitudinal extent of the engagement gap.

10. The motor vehicle lock arrangement according claim 9, wherein the elongate light region of the light arrangement is configured as an illuminant strip with a number of illuminants, in particular as LED strips with a number of LEDs, or wherein the elongate light region of the light arrangement is configured as a lightguide.

11. The motor vehicle door having the motor vehicle lock arrangement according to claim 1, wherein the motor vehicle door has an engagement region, behind which a user's hand can engage when the engagement gap is produced, and otherwise said engagement region is inaccessible to the user's hand.

12. A method for operating the motor vehicle lock arrangement of claim 1.

13. The motor vehicle lock arrangement according to claim 3, wherein the light arrangement illuminates in different colors depending on a lighting configuration, and/or wherein depending on the lighting configuration the light arrangement illuminates continuously or in a pulsed fashion, or in particular with different pulse frequencies, and/or depending on the lighting configuration the light arrangement illuminates with different brightness.

14. The motor vehicle lock arrangement according to claim 5, wherein in the mounted state the light arrangement illuminates in a rearward direction of the motor vehicle door in response to the pivoting open of the motor vehicle door.

15. The motor vehicle lock arrangement according to claim 13, wherein the light arrangement illuminates with a different lighting configuration with a different color and/or with a different pulse frequency, during the motor-operated push-open process and in response to the conclusion of the motor-operated push-open process.

16. The motor vehicle door having a motor vehicle lock arrangement according claim 11, wherein the motor vehicle door has a door outer skin which is configured without a handle.

17. A motor vehicle lock arrangement for a motor vehicle doorwhich is adjustably coupled to a motor vehicle body work, wherein the motor vehicle lock arrangement has a motor vehicle lock which in a mounted state is arranged on the motor vehicle door or on the motor vehicle body work, wherein the motor vehicle lock arrangement, in particular the motor vehicle lock has a push-open arrangement for applying a drive force to the motor vehicle door in its opening direction, so that the motor vehicle door can be adjusted, in a motor-operated push-open process, from a closed door position, in particular a main closed door position or a pre-closed door position, into a push-open door position which is located further in the opening direction of said motor vehicle door, and as a result an engagement gap can be produced between the motor vehicle door and the motor vehicle body work, wherein the motor vehicle lock arrangement has a light arrangement and a light controller for actuating the light arrangement, wherein the light arrangement is positioned within the engagement gap and between the motor vehicle door and motor vehicle body work, wherein the light controller is arranged in the motor vehicle lock and actuates the light arrangement into an illuminating state during the motor-operated push-open open process and/or in response to a conclusion of the motor-operated push-open process in a region of at least part of the engagement gap, and wherein an acoustic arrangement is provided for generating acoustic indication signals for a user, and that the acoustic arrangement generates said acoustic signals with predetermined synchronization with the light arrangement.

18. A motor vehicle lock arrangement for a motor vehicle doorwhich is adjustably coupled to a motor vehicle body work, wherein the motor vehicle lock arrangement has a motor vehicle lock which in a mounted state is arranged on the motor vehicle door or on the motor vehicle body work, wherein the motor vehicle lock arrangement, in particular the motor vehicle lock has a push-open arrangement for applying a drive force to the motor vehicle door in its opening direction, so that the motor vehicle door can be adjusted, in a motor-operated push-open process, from a closed door position, in particular a main closed door position or a pre-closed door position, into a push-open door position which is located further in the opening direction of said motor vehicle door, and as a result an engagement gap can be produced between the motor vehicle door and the motor vehicle body work, wherein the motor vehicle lock arrangement has a light arrangement and a light controller for actuating the light arrangement, wherein the light arrangement is positioned within the engagement gap and between the motor vehicle door and motor vehicle body work, wherein the light controller is arranged in the motor vehicle lock and actuates the light arrangement into an illuminating state during the motor-operated push-open open process and/or in response to a conclusion of the motor-operated push-open process in a region of at least part of the engagement gap, and wherein the light area of the light arrangement is configured as a light guide.

\* \* \* \* \*